United States Patent
Wolff

(10) Patent No.: US 10,053,038 B2
(45) Date of Patent: Aug. 21, 2018

(54) FRONT CARRIAGE FOR A MOTOR VEHICLE COMPRISING A BUMPER COVERING

(71) Applicant: GM GLOBAL TECHNOLOGY OPERATIONS LLC, Detroit, MI (US)

(72) Inventor: Stefan Wolff, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/443,293

(22) Filed: Feb. 27, 2017

(65) Prior Publication Data

US 2017/0247002 A1    Aug. 31, 2017

(30) Foreign Application Priority Data

Feb. 25, 2016 (DE) .................. 10 2016 002 215

(51) Int. Cl.
| | |
|---|---|
| *B60R 21/34* | (2011.01) |
| *B60R 19/38* | (2006.01) |
| *B60R 19/03* | (2006.01) |
| *B60R 19/02* | (2006.01) |

(52) U.S. Cl.
CPC ............ *B60R 19/38* (2013.01); *B60R 19/023* (2013.01); *B60R 19/03* (2013.01); *B60R 21/34* (2013.01); *B60R 2021/343* (2013.01)

(58) Field of Classification Search
CPC . B60R 19/26; B60R 19/34; B60R 2019/1886; B60R 13/04; B60R 19/03; B60R 19/12; B60R 19/14; B60R 19/30

USPC ....... 293/133, 155, 122, 132, 134, 108, 120, 293/37, 142; 296/187.09, 193.09
See application file for complete search history.

(56) References Cited

U.S. PATENT DOCUMENTS

| | | |
|---|---|---|
| 3,920,274 A | 11/1975 | Fannin |
| 4,807,915 A | 2/1989 | Shyi |
| 4,929,008 A | 5/1990 | Esfandiary |
| 7,284,788 B1 * | 10/2007 | Barbat ................ B60R 19/34 293/133 |
| 7,699,383 B2 * | 4/2010 | Fukukawa ............ B60R 19/12 293/132 |

(Continued)

FOREIGN PATENT DOCUMENTS

| | | |
|---|---|---|
| DE | 10238639 A1 | 3/2004 |
| DE | 102012008832 A1 | 10/2013 |

(Continued)

OTHER PUBLICATIONS

German Patent and Trade Mark Office, German Search Report for German Patent Application No. 10 2016 002 215.9 dated Jan. 20, 2017.

(Continued)

*Primary Examiner* — Darrell G Dayoan
*Assistant Examiner* — Sunsurraye Westbrook
(74) *Attorney, Agent, or Firm* — Lorenz & Kopf, LLP

(57) ABSTRACT

A front carriage for a motor vehicle includes a bumper covering and a support structure, which supports the bumper covering. At least one support device supports the bumper covering against the support structure in the direction of the vehicle height (z) and enables a deformation movement of the bumper covering relative to the support structure in longitudinal vehicle direction (x) in the event of a crash.

17 Claims, 4 Drawing Sheets

(56) References Cited

U.S. PATENT DOCUMENTS

| | | | |
|---|---|---|---|
| 7,988,225 B2 | 8/2011 | Goldsberry | |
| 8,029,049 B2* | 10/2011 | Ito | B62D 25/163 |
| | | | 296/191 |
| 9,227,584 B2 | 1/2016 | Buenger et al. | |
| 2007/0284897 A1 | 12/2007 | Schwab | |
| 2010/0148525 A1* | 6/2010 | Abdelnour | B60R 19/52 |
| | | | 293/115 |
| 2013/0113225 A1* | 5/2013 | Buenger | B60R 19/12 |
| | | | 293/132 |
| 2013/0175813 A1* | 7/2013 | Mana | B60R 19/18 |
| | | | 293/120 |
| 2015/0069773 A1 | 3/2015 | Mukainakano et al. | |

FOREIGN PATENT DOCUMENTS

| | | |
|---|---|---|
| DE | 102013222489 A1 | 5/2014 |
| EP | 1780086 A2 | 5/2007 |
| GB | 1365203 | 8/1974 |
| GB | 2281260 A | 3/1995 |
| GB | 2394920 A | 5/2004 |
| GB | 2521271 A | 6/2015 |

OTHER PUBLICATIONS

Intellectual Property Office, Search Report for Great Britain Patent Application No. GB1701370.7 dated Jul. 19, 2017.

\* cited by examiner

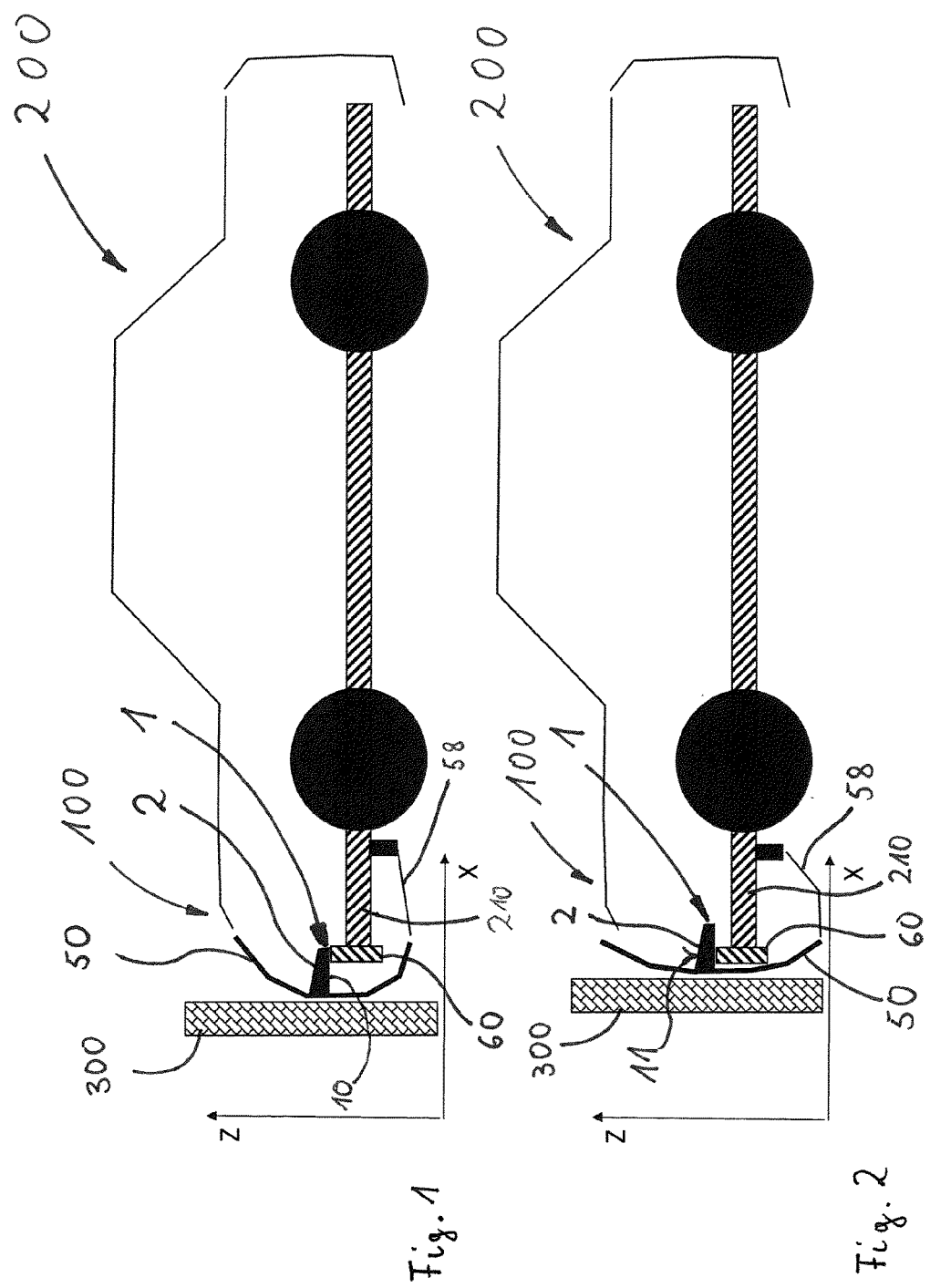

FRONT CARRIAGE FOR A MOTOR VEHICLE COMPRISING A BUMPER COVERING

CROSS-REFERENCE TO RELATED APPLICATION

This application claims priority to German Patent Application No. 102016002215.9, filed Feb. 25, 2016, which is incorporated herein by reference in its entirety.

TECHNICAL FIELD

The present disclosure pertains to a front carriage for a motor vehicle including a bumper covering and a support structure supporting the bumper covering.

BACKGROUND

Due to steadily increasing demands on pedestrian protection for motor vehicles, the focus in new or further developments is on the front bumper covering of the motor vehicle. This is so, because in response to a leg impact of a pedestrian against the motor vehicle, it is typically the bumper covering that the pedestrian hits with his legs, which is affected.

In addition, the aim is for the bumper covering to be retained on the motor vehicle as positionally accurately as possible, so as to permanently adhere to provided gap sizes to adjacent components of the motor vehicle or assembly parts in the bumper covering, such as the headlights, for example.

SUMMARY

The present disclosure is thus providing at least one option for a bumper covering to be present on the front carriage in a predetermined position for effective passenger protection in the event of a crash, for example in response to a leg impact by a pedestrian.

According to an embodiment of the present disclosure, provision is made for a front carriage for a motor vehicle including a bumper covering and a support structure, which supports the bumper covering. The support structure can be a bumper cross member. On principle, the support structure can be any component of the vehicle body, provided that it is embodied to be able to support the bumper covering. A plurality of components of the front carriage or of the motor vehicle, respectively, can also form the support structure.

The front carriage includes at least one support device, by which the bumper covering is supported against the support structure in the direction of the vehicle height and for a deformation movement of the bumper covering relative to the support structure in longitudinal vehicle direction to be permitted in the event of a crash, such as for example in response to a leg collision of a pedestrian. In particular, the bumper covering is supported against the support structure either directly or indirectly via an intermediate component in the direction of the vehicle height by the support device. The bumper covering can also be located below the support structure. The intermediate component is then used as support in the direction of the vehicle height.

The deformation movement is to be understood as the movement of the bumper covering in the event of a collision or impact of the motor vehicle on the bumper covering with an object, such as the leg of a pedestrian, for example. On principle, this can also be a collision of the motor vehicle with another motor vehicle or a lamp post or a similar obstacle. The movement of the bumper covering relative to the support structure can also be affected without a deformation of the pedestrian covering. In this respect, the name deformation movement includes a movement, which is affected and/or supported by the deformation of the bumper covering, as well as a movement without deformation or at least only a negligibly small deformation of the bumper covering.

A pedestrian protective measure in the area of the bumper covering has thus been taken effectively by a front carriage, in that the bumper covering can give way backwards in longitudinal vehicle direction in response to a vehicle impact, for example against a pedestrian. A deformation of the bumper covering, by which collision energy is absorbed and the consequences of the collision of the pedestrian with the motor vehicle are alleviated, is thus favored. The evasive movement of the bumper covering as such also already alleviates the effect of the collision for the pedestrian.

In addition, the front carriage ensures that the bumper covering is retained in a positionally accurate manner on the motor vehicle. This is so, because the support of the bumper covering in the direction of the vehicle height prevents that the bumper covering sags downwards over time in the area of the support device and that gap sizes are thus increased in an optically noticeable manner and/or that an unintentional change in position of mounting parts occurs at the bumper covering.

According to an embodiment of the present disclosure, the support device includes a guide function with respect to the deformation movement of the bumper covering in the longitudinal vehicle direction in the event of a crash. For example, the bumper covering is guided in the transverse vehicle direction and/or in the direction of the vehicle height in the deformation movement. In the event of a crash, for example when a pedestrian's leg impacts the bumper covering, a controlled movement of the bumper covering across a predetermined path is thus reached, so that an unintentional compensation movement of the bumper covering is counteracted.

According to a further embodiment of the present disclosure, the support device includes a support function in a transverse vehicle direction on the bumper covering. This prevents that the position of the bumper covering changes in transverse vehicle direction over time and that possible gap sizes are thus increased in an optically noticeable manner. Provision can be made for the support device to exert its support function on the bumper covering only in one direction in transverse vehicle direction. The support device can also include a support function on the bumper covering in both directions in transverse vehicle direction.

According to a further embodiment of the present disclosure, the bumper covering has at least two connecting points, which are spaced part relative to one another in transverse vehicle direction and via which the bumper covering is fastened to the support structure and/or another body part, in particular in longitudinal vehicle direction, transverse vehicle direction, and is retained in the direction of the vehicle height with respect to the support structure or the other body part, respectively. It thereby lends itself for the support device to be arranged between the connecting points. The bumper covering is thus attached to the front carriage in a predetermined position in a permanent and positionally accurate manner. A possible downward sagging of the bumper covering is prevented effectively. This is so, because the bumper covering is retained in a positionally fixed manner by the connecting points. The distance between the connecting points is covered by the support device, by which a downward sagging is counteracted, in that the bumper covering is supported in the direction of the vehicle height.

For example, viewed in transverse vehicle direction, the connecting points are in each case arranged laterally in the area of one end of the bumper covering. In addition, the bumper covering can have at least one connecting point in the area of its lower edge, for example so as to be connected thereto by a lower reinforcement component of the vehicle body and/or of the bumper covering. This component can be a component, which absorbs impact energy, so that impact energy is introduced into the component via the bumper covering in the event of a crash, and so that the impact energy is at least partially reduced in this manner not only by the deformation of the bumper covering, but also by the deformation of the component, which absorbs impact energy.

The support device can be provided at least twice. It lends itself for this case for both support devices to be arranged between the connecting points and to be spaced apart relative to one another in transverse vehicle direction. The support effect with respect to the bumper covering is thus increased in the direction of the vehicle height, in particular downwards.

A further embodiment of the present disclosure provides for the support device to be formed by an elongated support element, which projects away from the bumper covering, or has such a support element, which rests against a support surface of an abutment, which is assigned to the support structure and which can be shifted in a gliding manner on the support surface in response to a deformation movement of the bumper covering. The support device is thus realized in a technically simple manner. For example, the support element is a slide shoe, which can slide against the support surface.

It lends itself for the abutment to be fastened to the support structure, in particular in longitudinal vehicle direction, transverse vehicle direction, and to be retained in the direction of the vehicle height with respect to the support structure. The abutment thus forms a positionally stable bearing point, which has a high bearing stability even in the event of a crash.

Provision can be made for another end of the abutment to additionally be connected either directly or indirectly via an intermediate component, such as a connecting support, for example, to the support structure or to another body part and for the support surface to be arranged between this connection and the connection to the above-described support structure. This measure is aimed at connecting the abutment to the vehicle body or to other components of the vehicle body as strongly and durably as possible.

According to a further embodiment of the present disclosure, provision is made for the abutment to have at least one bounding surface and/or guide surface, through which the movement of the support element is guided in transverse vehicle direction in response to a deformation movement of the bumper covering or through which at least an evasive movement is limited in transverse vehicle direction. It is ensured through this that in response to a deformation movement of the bumper covering, the movement of the support element effected through this does in fact take place or at least substantially takes place on the predetermined trajectory in longitudinal vehicle direction.

In an embodiment of the present disclosure, which can be realized in a technically simple manner, provision is made for the abutment to have an opening, in particular passage opening, into which the support element projects, wherein at least a section of the boundary of the opening forms the support surface. The support element can support itself downwards on the boundary through the opening. Due to the boundary of the opening, which revolves on the circumference, the movement of the support element accommodated therein is guided upwards in the direction of the vehicle height and in transverse vehicle direction towards both sides or is limited at least in an evasive movement, depending on the embodiment of the width of the opening with respect to the cross sectional dimension of the support element.

It lends itself that, viewed in longitudinal vehicle direction and starting at the bumper covering in the direction towards the abutment, the front carriage has a free space in the area downstream from the abutment as accommodating space for the support element, into which the support element can be inserted relative to the abutment in response to a deformation movement of the bumper covering. It is ensured through this that, in the event of a crash, the support element can move in longitudinal vehicle direction, without being disrupted thereby by components or other obstacles located in the path of the movement and that the deformation movement of the bumper covering can thus unfold only to a limited extent.

The abutment can be a metal part. For example, the abutment is a formed part, which is produced by forming or bending. A stable and durable abutment is thus realized in a simple manner. The abutment can be a sheet metal part, which has reinforcing ribs or folds or similar bent edge sections, for example, by which the abutment is reinforced in its longitudinal and/or transverse extension, in particular stiffened.

It lends itself for the support element to be a plastic part, which is integrally molded to the bumper covering, for example. The support element can thus be realized and installed in a technically simple manner, because it is already present at the bumper covering.

Provision can also be made for the bumper covering to have a radiator grill structure, to which the support element is integrally molded. Possible injection parts can thus be covered aesthetically towards the outside, because the injection parts can be recognized outwardly on the radiator grill structure. In that the radiator grill structure is covered by the bumper covering in the area of the injection or gate surface for the support element, the connecting area of the support element is designed so as to be outwardly inconspicuous from an aesthetic aspect.

According to a further embodiment of the present disclosure, provision is made for at least one element, which absorbs or consumes impact energy, respectively, to be assigned to the support device, by which the impact energy contained in the deformation movement of the bumper covering, in longitudinal vehicle direction, is at least partially reduced in the event of a crash. A further pedestrian protection measure has thus been taken.

For example, the element, which absorbs impact energy, can be formed by at least one surface, which runs at an angle or conically, or any other thickening longitudinal extension of at least a section of the outer surface of the support element, so that the support element slides along the boundary of the opening of the abutment in response to a deformation movement of the bumper covering under material removal and/or material deformation. The element, which absorbs impact energy, is thus realized in a technically simple manner, because the support element itself, which simultaneously acts as the element that absorbs impact energy in the event of a crash, is fallen back on for this purpose.

BRIEF DESCRIPTION OF THE DRAWINGS

The present disclosure will hereinafter be described in conjunction with the following drawing figures, wherein like numerals denote like elements.

FIG. 1 shows an embodiment of a motor vehicle prior to an impact against a leg of a pedestrian in a sectional illustration;

FIG. 2 shows the motor vehicle according to FIG. 1 after an impact against a leg of a pedestrian in sectional illustration;

DETAILED DESCRIPTION

Figure 3:
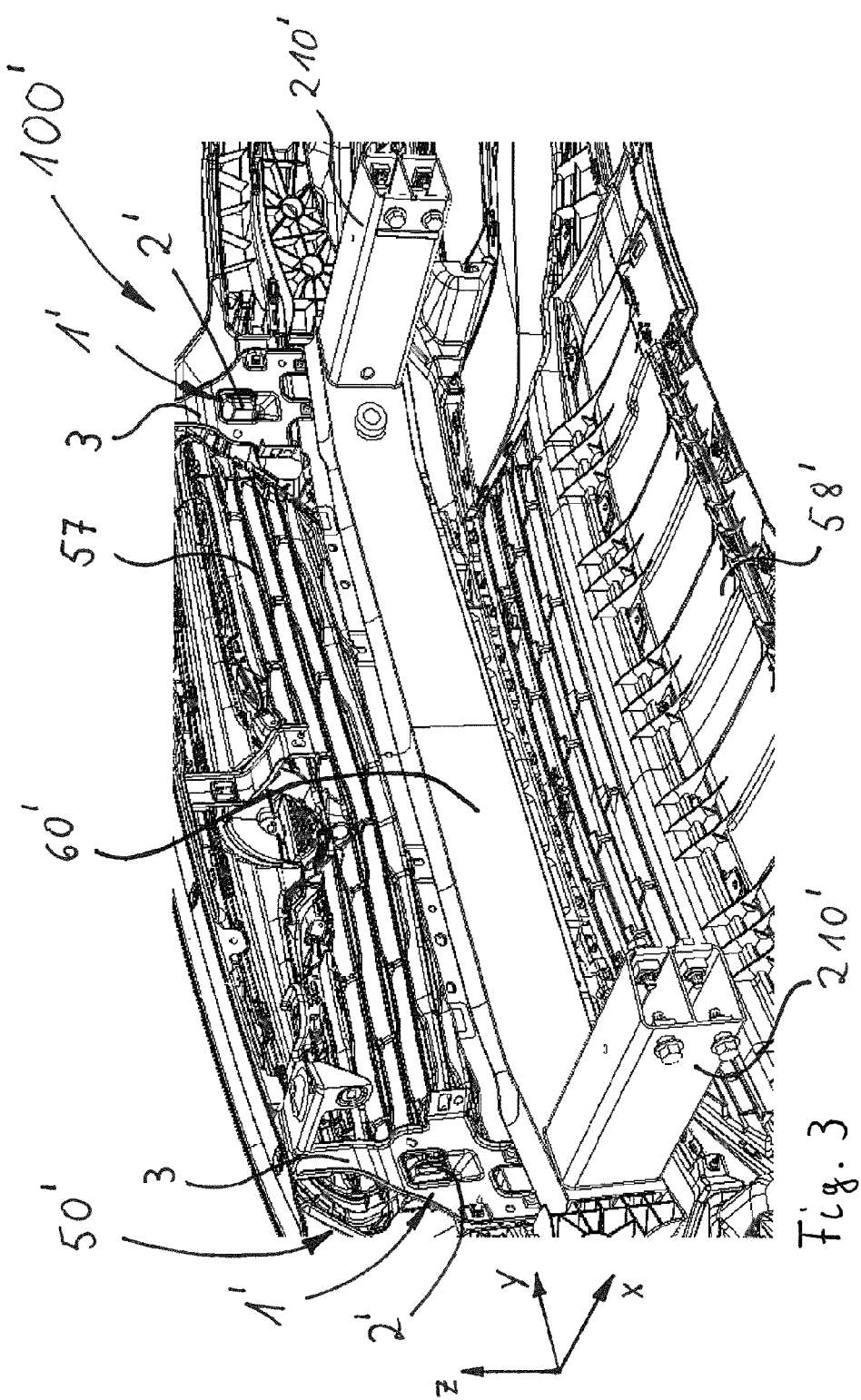
FIG. 3 shows an embodiment of a front carriage in perspective illustration, viewed as partial section, in the direction from the inside against a bumper covering.

The following detailed description is merely exemplary in nature and is not intended to limit the invention or the application and uses of the invention. Furthermore, there is no intention to be bound by any theory presented in the preceding background or the following detailed description.

FIG. 1 shows—in schematic illustration—an embodiment of a motor vehicle 200 including a front carriage 100, which has a bumper covering 50. At least one connecting area of the bumper covering 50 to the front carriage 100 can be seen from the sectional illustration of FIG. 1. In this connecting area, the bumper covering 50 is supported by a support structure 60, for example a bumper beam. The support structure 60, in turn, can be connected to at least one longitudinal support 210 of the motor vehicle 200, in particular fastened thereto.

The connection of the bumper covering 50 to the support structure 60 is realized by a support device 1, by which the bumper covering 50 is supported against the support structure 60 in the direction of the vehicle height (z). For this purpose, the support device 1 has a support element 2, which is supported directly or indirectly via an intermediate component in the direction of the vehicle height (z).

The bumper covering 50 is preferably provided with an element 58, which absorbs impact energy. The element 58, which absorbs impact energy, can be arranged in the area of the lower end of the bumper covering 50, viewed in the direction of the vehicle height (z), and can extend from there, for example, from the bumper covering 50 backwards in longitudinal vehicle direction (x) and, viewed in longitudinal vehicle direction (x), can be connected to the at least one longitudinal support 210 of the vehicle in the area of the rear end. For example, the element 58, which absorbs impact energy, is a so-called lower bumper stiffner (LBS).

FIG. 1 shows the motor vehicle 200 prior to an impact of the bumper covering 50 against an obstacle 300, which is a leg of a pedestrian, for example. FIG. 2 shows the motor vehicle 200 according to FIG. 1 after an impact against the obstacle 300.

As can be seen from FIG. 2, the bumper covering 50 was pushed backwards in longitudinal vehicle direction (x) as a result of the force of the impact of the front carriage 100 against the obstacle 300. A deformation of the bumper covering 50 can have occurred through this. Such a deformation of the bumper covering 50 can take place in such a way that the bumper covering 50 is bent open upwards and/or downwards in the direction of the vehicle height (z), so that impact energy is already absorbed to a certain extent by this deformation movement of the bumper covering 50. The element 58, which absorbs additional impact energy, which can be present, is thereby also activated, in that it also deforms, as illustrated in an exemplary manner in FIG. 2, by absorption of at least a portion of the impact energy.

The movement of the bumper covering 50 in the event of such a crash is made possible in that the support device 1 is embodied in such a way that the bumper covering 50 is supported against the support structure 60 in the direction of the vehicle height (z) and in that a movement of the bumper covering 50 relative to the support structure 60 is permitted in longitudinal vehicle direction (x) in the event of a crash. For this purpose, provision is preferably made for the support element 2, which is arranged on the bumper covering 50 and which projects away from the bumper covering 50 in longitudinal vehicle direction (x) in the direction towards the rear of the motor vehicle 200.

For this purpose, the support element 2 preferably has a sliding surface 10, via which the support element 2 supports itself on the support structure 60 and along which the support element 2 glides backwards with respect to the support structure 60 in longitudinal vehicle direction (x) in the event of a crash. The support element 2 is preferably a plastic part. The bumper covering 50 is preferably a plastic part, to which the support element 2 is connected with one end, in particular integrally molded.

Figure 4:
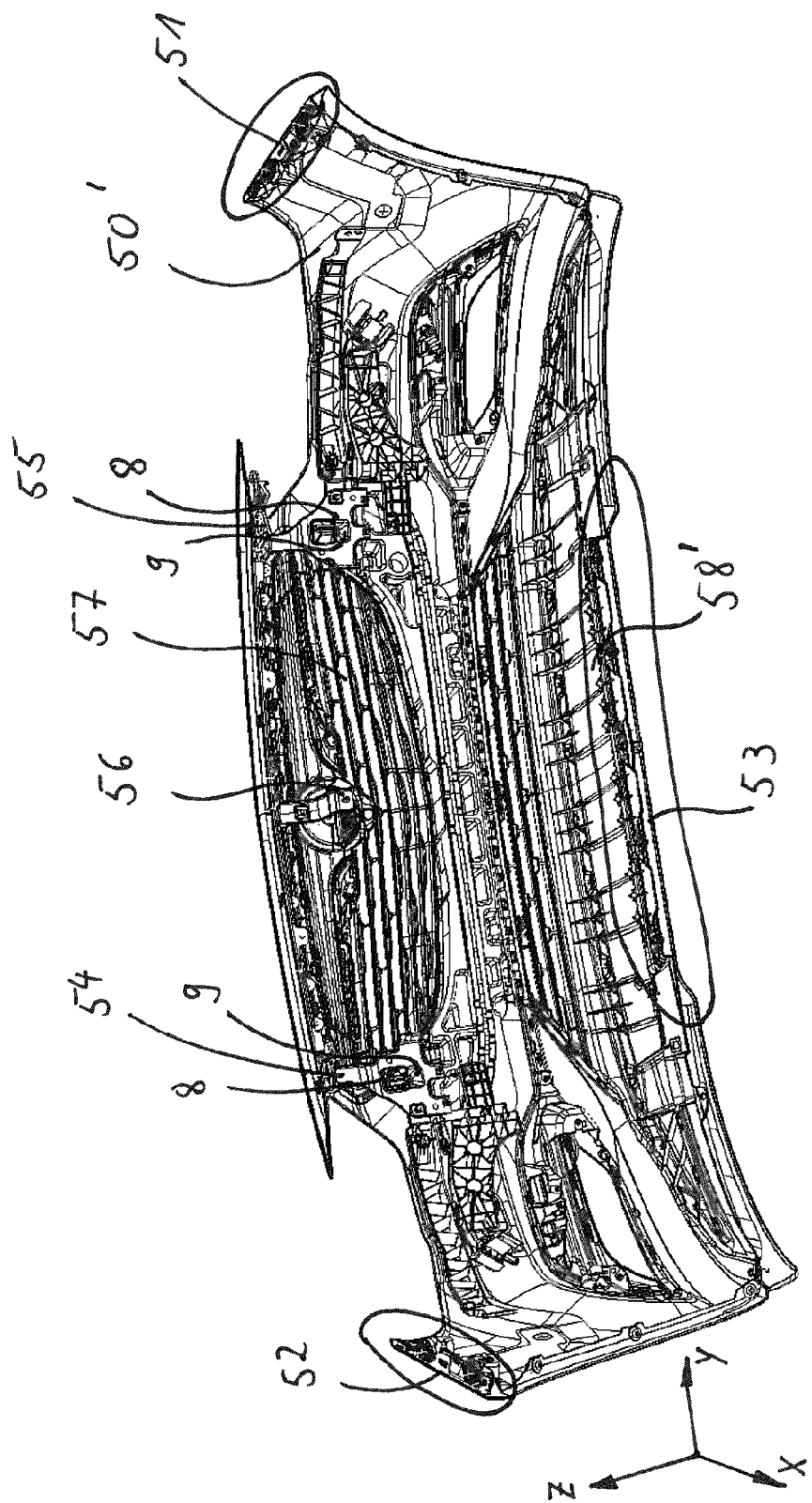
FIG. 4 shows the area of the front carriage according to FIG. 3 in another perspective illustration.

FIGS. 3 and 4 shows a further possible embodiment of a front carriage 100' for a motor vehicle. FIG. 3 only shows a section of the front carriage 100' and a bumper covering 50' of the front carriage 100' is illustrated in FIG. 4. The front carriage 100' according to FIGS. 3 and 4 differs from the front carriage 100 according to FIG. 1 in that, among others, at least one support device 1' is provided, which has a support element 2', in particular elongated support element 2', which projects rearwards, from the bumper covering 50' in longitudinal vehicle direction (x) and which is supported against an abutment 3. The abutment 3 is assigned to a support structure 60', which can be a bumper cross member, for example. The support structure 60' is fastened to longitudinal supports 210' of the vehicle support structure, for example.

The bumper covering 50' includes a radiator grill structure 57, which is connected to the bumper covering 50', in particular integrated therein. For example, the radiator grill structure 57 is removably connected to the bumper covering 50'. In the case of this embodiment of the front carriage 100', the support element 2' of the support device 1' is arranged on the radiator grill structure 57, in particular connected thereto, such as integrally molded thereto, for example.

As can be seen from FIG. 4, the bumper covering 50' has two connecting points 51 and 52, via which the bumper covering 50' can be connected to a body part, such as a fender structure, for example in that the bumper covering 50' is retained by the connecting points 51 and 52 in longitudinal vehicle direction (x), transverse vehicle direction (y) and in the direction of the vehicle height (z) with respect to the body part. The support device 1' is preferably arranged between the connecting points 51 and 52. The support device 1' is preferably present at least twice. The support devices 1' are then preferably arranged laterally reversed to one another. The support devices 1' are preferably in each case arranged in the area of an outer side of the radiator grill structure 57. The respective support element 2' is assigned to the radiator grill structure 57.

The bumper covering 50' can have further connecting points 53, 54, 55 and 56. For example, the connecting point 53 is embodied on an element 58', which absorbs impact energy and which can be a lower bumper stiffner, for example, wherein the element 58', which absorbs impact energy, can be arranged below the bumper covering 50', viewed in the direction of the vehicle height (z). The connecting point 53 on the element 58', which absorbs impact energy, can be used for the connection to one or both of the longitudinal supports 210' or an interconnected intermediate structure. The connecting points 54 and 55 can be arranged in the area of the upper end of the bumper covering 50', viewed in the direction of the vehicle height (z), and can be used to connect the bumper covering 50' to the vehicle body in the part, which connects upwards to the bumper covering 50'.

The bumper covering 50' can be fixedly connected to the vehicle body in longitudinal vehicle direction (x), transverse vehicle direction (y) and in the direction of the vehicle height (z) by the connecting points 51, 52, 53, 54, 55 and 56, which can also be embodied as connecting areas and which are identified in FIG. 4 by circles or oval circles. A downward sagging of the bumper covering 50' in the direction of the vehicle height (z) is prevented by the two support devices 1' in a technically simple manner. This is so, because the bumper covering 50' is supported against the support structure 60', at least in the area between the two connecting points 51 and 52, which are located on the outside, by the support devices 1'. A movability of the bumper covering 50' backwards in longitudinal vehicle direction (x) in the area of the support devices 1' is thereby made possible, so that the bumper covering 50' can carry out a backwards deformation movement in longitudinal vehicle direction (x) in the event of a crash, such as, for example, in response to an impact of a leg of a pedestrian.

Figure 5:
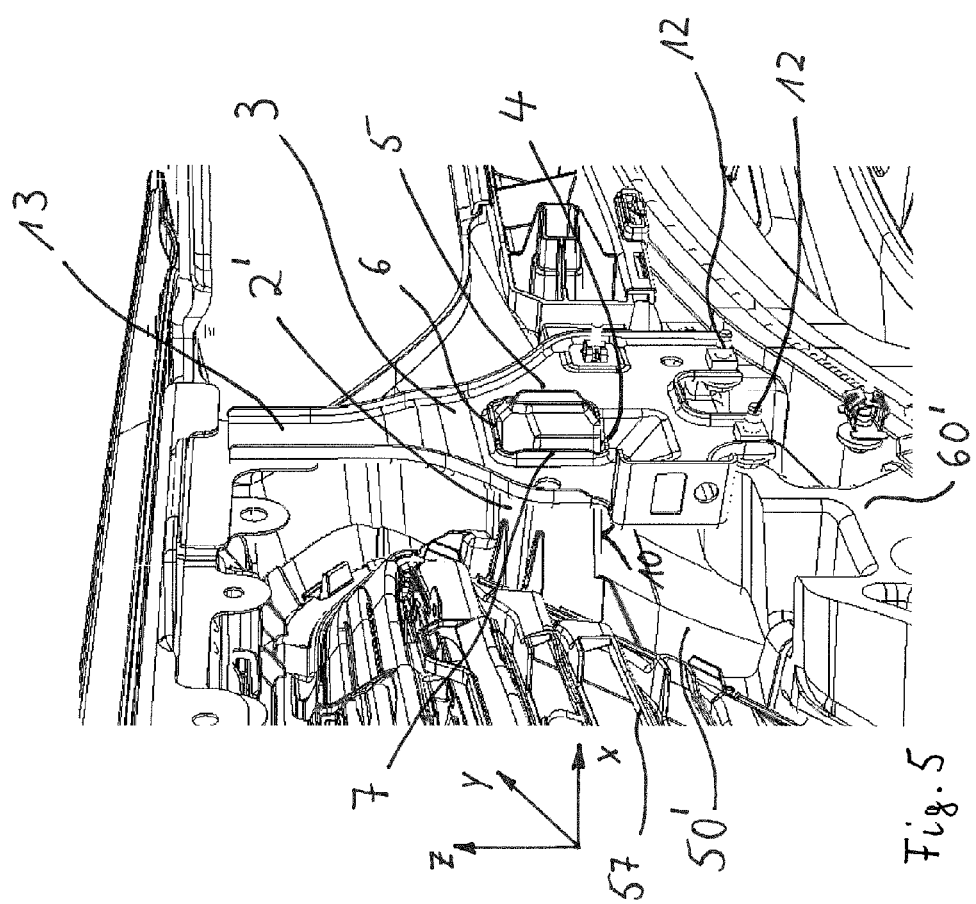
FIG. 5 shows a section from the front carriage according to FIGS. 3 and 4 in the area of a support device in perspective illustration.

FIG. 5 shows the setup of the support device 1' of the front carriage 100' according to FIGS. 3 and 4 in a section. The abutment 3 of the support device 1' is preferably formed by a surface structure, which extends in the direction of the vehicle height (z) and which is connected to the support structure 60' via at least one connecting point in the area of one end. Provision can be made for this purpose for connecting elements 12, such as screw elements or rivet elements. The connection to this connecting point can also be carried out by joining methods, such as welding, soldering or the like.

In the area of its end 13, which is located upwards in the direction of the vehicle height (z), the abutment 3 is fixedly connected to a part of the body structure, which can be the front structure of the motor vehicle, for example by welding, soldering or another joining method. In principle, a connection by a connecting element, such as a screw element, a rivet element or the like can also be made at this location.

The abutment 3 is preferably a sheet metal part, which at least partly has a bent, for example along its longitudinal side, for reinforcing or stiffening, respectively. The abutment 3 preferably has an opening 8, which is a passage opening into which the support element 2' protrudes. At least a section of the boundary 9 of the opening 8 thereby serves as support surface 4, against which the support element 2' is supported in the direction of the vehicle height (z) and along which the support element 2' slides in longitudinal vehicle direction (x) in the event of a crash. For this purpose, the support element 2' has a surface section, which is embodied as sliding surface 10'. Further sections of the boundary 9 of the opening 8 serve as boundary surfaces 5, 6, 7, through which the movement of the support element 2' is guided on both sides in transverse vehicle direction (y) and upwards in the direction of the vehicle height (z), or through which at least an evasive movement of the support element 2' is limited in these directions in response to a deformation movement of the bumper covering 50'.

The support device 1' can be embodied in such a way that the support device 1' itself has an impact energy-absorbing effect in the event of a crash. For this purpose, the support element 2', which can be embodied as slide shoe, for example, can be embodied at least partially diagonally in the direction of an outer side, which extends in longitudinal vehicle direction (x), so that the cross section of the support element 2' decreases in longitudinal vehicle direction (x) away from the bumper covering 50'. Such a surface, which runs diagonally, is illustrated in an exemplary manner in FIGS. 1 and 2 and is provided with reference numeral 11 therein. Due to the diagonally running surface 11, the support element 2' slides along the boundary 9 of the opening 8 of the abutment 3 under material removal and/or material deformation in the event of a crash and a deformation movement of the bumper covering 50' effected thereby, and a deformation resistance, which is directed in longitudinal vehicle direction (x), by which at least a portion of the impact energy is reduced, is built up.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A front carriage for a motor vehicle comprising:
   a bumper covering;
   a support structure having a bumper beam and at least one support device supporting the bumper covering against the bumper beam in the direction of a vehicle height (z) and enabling a deformation movement of the bumper covering relative to the bumper beam in a longitudinal vehicle direction (x) during an impact event, the support device including a support element projecting away from the bumper covering and resting against a support surface on an abutment coupled with the support structure for gliding movement on the support surface in response to the deformation movement of the bumper covering; and
   wherein the front carriage defines a free space in an area downstream starting at the bumper covering in the direction towards the abutment when viewed in a longitudinal vehicle direction (x) for accommodating the support element relative to the abutment in response to the deformation movement of the bumper covering.

2. The front carriage according to claim 1, wherein the support device is configured to guide the deformation movement of the bumper covering in the longitudinal vehicle direction (x) in the event of the impact event.

3. The front carriage according to claim 2, wherein the support device supports the bumper covering in a transverse vehicle direction (y).

4. The front carriage according to claim 1, wherein the bumper covering comprises at least two connecting points, which are spaced apart relative to one another in a transverse vehicle direction (y), the connecting points fastening the bumper covering to at least one of the bumper beam and a body part, wherein the support device is arranged between the connecting points.

5. A front carriage for a motor vehicle comprising:
a bumper covering;
a support structure having a bumper beam and at least one support device supporting the bumper covering against the bumper beam in the direction of a vehicle height (z) and enabling a deformation movement of the bumper covering relative to the bumper beam in the longitudinal vehicle direction (x) during an impact event, wherein the support device comprises a support element projecting away from the bumper covering and resting against a support surface on an abutment coupled with the support structure for gliding movement on the support surface in response to the deformation movement of the bumper covering, wherein the abutment comprises a sheet metal part.

6. The front carriage according to claim 5, wherein the abutment comprises at least one bounding surface and a guide surface, through which the movement of the support element is guided in the transverse vehicle direction (y) in response to the deformation movement of the bumper covering.

7. The front carriage according to claim 5 wherein the abutment has an opening formed therein into which the support element protrudes, wherein a boundary of the opening forms the support surface.

8. The front carriage according to claim 5, further comprising a free space in an area downstream starting at the bumper covering in the direction towards the abutment when viewed in longitudinal vehicle direction (x), wherein the support element can be inserted into the free space for accommodating the support element relative to the abutment in response to the deformation movement of the bumper covering.

9. The front carriage according to claim 5 wherein the support element comprises a plastic part integrally molded to the bumper covering.

10. The front carriage according to claim 5, wherein the bumper covering comprises a radiator grill structure to which the support element is integrally molded.

11. The front carriage according to claim 5, further comprising an energy absorbing element configured to absorb impact energy contained in the deformation movement of the bumper covering.

12. The front carriage according to claim 11, wherein the energy absorbing element is formed by at least one surface, which runs at an angle, so that the support element slides along a boundary of an opening in the abutment in response to the deformation movement of the bumper covering under material deformation.

13. The front carriage according to claim 11, wherein the energy absorbing element is formed of a thickening longitudinal extension of at least a section of the outer surface of the support element, so that the support element slides along a boundary of an opening in the abutment in response to the deformation movement of the bumper covering under material deformation.

14. A motor vehicle comprising body structure having a front carriage according to claim 1.

15. A front carriage for a motor vehicle comprising:
a bumper covering;
a support structure having a support beam and a support element projecting away from the bumper covering, the support element supporting the bumper covering against the bumper beam in the direction of a vehicle height (z), the support structure enabling a deformation movement of the bumper covering relative to the bumper beam in the longitudinal vehicle direction (x) during an impact event;
a sheet metal abutment coupled with the support structure and having a support surface;
wherein the support structure is engaged with the support surface and allows relative gliding movement between the bumper cover and the support structure on the support surface in response to the deformation movement of the bumper covering.

16. The front carriage according to claim 15 wherein the support element comprises a plastic part integrally molded to the bumper covering.

17. The front carriage according to claim 15, wherein the bumper covering comprises an integrally molded radiator grill structure.

* * * * *